(12) United States Patent
Kiefer et al.

(10) Patent No.: US 7,064,581 B2
(45) Date of Patent: Jun. 20, 2006

(54) BUS INTERFACE AND METHOD FOR COUPLING A BUS DEVICE TO A BUS

(75) Inventors: Hans-Friedrich Kiefer, Kornwestheim (DE); Mathias Fiedler, Muehlacker (DE); Jochen Huebl, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 10/450,734

(22) PCT Filed: Nov. 22, 2001

(86) PCT No.: PCT/DE01/04407

§ 371 (c)(1),
(2), (4) Date: Nov. 12, 2003

(87) PCT Pub. No.: WO02/49302

PCT Pub. Date: Jun. 20, 2002

(65) Prior Publication Data

US 2004/0075467 A1    Apr. 22, 2004

(30) Foreign Application Priority Data

Dec. 13, 2000  (DE)  ................................. 100 61 945

(51) Int. Cl.
*H03K 19/094*    (2006.01)
(52) U.S. Cl. ............................. 326/86; 326/82; 326/90
(58) Field of Classification Search ............ 326/82–83, 326/86, 90, 115, 126, 127
See application file for complete search history.

(56) References Cited

U.S. PATENT DOCUMENTS 6,111,431 A    8/2000  Estrada
6,237,107 B1 *  5/2001  Williams et al. ............ 713/503

* cited by examiner

*Primary Examiner*—Anh Q. Tran
(74) *Attorney, Agent, or Firm*—Kenyon & Kenyon

(57) ABSTRACT

A bus interface is described, in particular in motor vehicles, for connecting a bus device to a bus using a pair of complementary bus lines, including a first driver circuit whose input is connected to the bus device and whose output is connected to the first bus line of the pair of complementary bus lines, and a second driver circuit, which is complementary to the first driver circuit and whose output is connected to the second bus line of the pair of complementary bus lines, the input of the second driver circuit being connected to the output of the first driver circuit.

9 Claims, 3 Drawing Sheets ically occurs due to different signal transit times in the driver circuits. Likewise, effects of the dependence of signal transit time on component tolerances and dependence on operating point (supply voltage, temperature and the like) are minimized.

BUS INTERFACE AND METHOD FOR COUPLING A BUS DEVICE TO A BUS

FIELD OF THE INVENTION

The present invention relates to a bus interface as well as a method for connecting a bus device to a bus.

BACKGROUND INFORMATION

Bus interfaces and/or connecting methods are available, e.g., for a controller area network bus (CAN bus) in motor vehicles. Such a bus has a pair of bus lines, wherein one bus line has a signal level with a time characteristic that is complementary to that of the other bus line. The bus interfaces are used for coupling of bus devices in phase opposition, e.g., communication components, systems and/or subsystems, to the bus. A bus interface having a pair of driver circuits is known, wherein a first driver circuit with an output is connected to the first bus line and a second driver circuit which is complementary in operation to the first driver circuit which has an output that is connected to the second bus line. Each driver circuit has a switching element, one being implemented as a p-channel transistor and the other being implemented as an n-channel transistor.

In the case of such a bus interface, the inputs of both driver circuits are connected to the bus device. Triggering of the two driver circuits in phase opposition is accomplished with an inverting element at one of the two inputs. However, the triggering of the two driver circuits in phase opposition thus embodied results in phase displacement and asymmetry between the output signals of the two driver circuits because of differences in transit time, differences in the p- and n-channel transistors used and/or component tolerances. Consequently, there is the risk that the output signals are not sufficiently accurately in phase opposition, which results in increased high-frequency emission to the outputs and the bus lines.

U.S. Pat. No. 6,111,431 relates to a driver circuit for transmitting a differential signal to an external circuit. According to this embodiment, the driver circuit has a plurality of transistors P21, P22 and P33. In the event of an output-end short circuit to the driver circuit, damage to transistors N21, N22 is prevented by a component R31. Transistors N11 and N12 are protected from a short circuit in the driver circuit in a similar manner. Transistors P21 and P22 are controlled by a first operational amplifier OPAMP1, while transistors N11 and N12 are controlled by a second operational amplifier OPAMP2. Transistors N22, N23 and transistors N21, N24 are alternately turned on and off by the arrangement of two inverters IV31, IV34 and NOR gates 31, 34 and NOR gates 32, 33.

SUMMARY OF THE INVENTION

The bus interface according to an exemplary embodiment and/or method of the present invention may have the advantage over other designs wherein the use of the output signal of the first driver circuit for triggering the second driver circuit results in a more pronounced phase opposition of the two output signals. The voltage range of the output signals may be kept constant. High-frequency emissions are thus reduced.

The exemplary embodiment and/or method of the present invention also provides a voltage divider between the outputs of the driver circuits for triggering the second driver circuit and for tapping the center voltage. The second driver circuit may be configured as a regulating circuit which regulates the center voltage of the voltage divider at a predetermined level, in particular at half the supply voltage. The second driver circuit is advantageously formed by an operational amplifier. The bus may be a CAN bus, as is conventional in motor vehicles today, in particular a serial bus. The present invention also includes a method of connecting a bus device to a bus.

A differential amplifier having a differential output which is activated only by a received signal may also be used.

DETAILED DESCRIPTION

Figure 1:
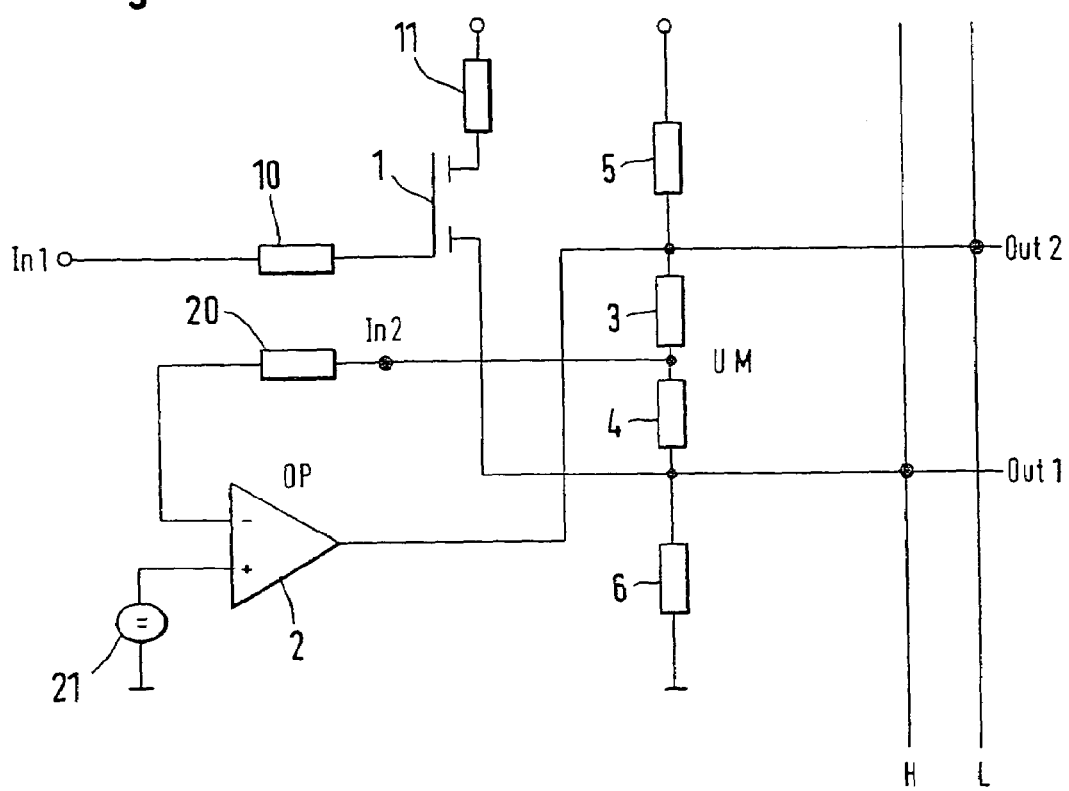
FIG. 1 is a view of a bus interface according to an exemplary embodiment and/or method of the present invention.

The bus interface according to FIG. 1 is intended to be switched between a bus device at input In1 and a bus having lines H, L at outputs Out1, Out2.

The bus may be a serial controller area network bus such as that used in motor vehicles. The bus has two complementary lines H, L, which has signal levels that are to be in mutual phase opposition, i.e., when the signal on one bus line is at a low level, the signal on the other bus line is at a high level.

The phase opposition of the signals on the two bus lines H, L is ensured by two driver circuits 1, 10, 11, 2, 20, 21. First driver circuit 1, 10, 11 having switching element 1 and resistors 10, 11 is connected to the input of the bus device. If switching element 1 is conducting, then output line Out1 is at a high level. If switching element 1 is blocking, output signal Out1 is at a low level accordingly. The input of second driver circuit 2, 20, 21 is not connected to the bus device but instead receives in input In2 a signal coming from output Out1 of first driver circuit 1, 10, 11. The signal is picked up in the middle of a voltage divider which has resistors 3, 4 and is connected between two outputs Out1 and Out2.

The equilibrium level at the outputs is set via resistors 3, 4, 5, 6. U denotes the power supply voltage.

Second driver circuit 2, 20, 21 has an operational amplifier 2 which is wired to function as a regulating circuit. The regulating circuit is set via resistor 20 at the inverting input and voltage source 21 at the non-inverting input so that center voltage UM is regulated by the voltage divider, formed by two resistors 3, 4, at half of power supply voltage U/2. Thus, when output signal Out1 increases, center voltage UM also increases. This center voltage UM is looped back to the inverting input of operational amplifier 20. As a response to the increase in the input voltage at the inverting input, operational amplifier 20 lowers the voltage level at output Out2 accordingly, so that level UM is set at half of power supply voltage U/2. If output signal Out1 drops, the mechanism described here is reversed, and output signal Out2 becomes a higher-level signal. This achieves a mutual phase opposition of the two output signals Out1 and Out2.

Driver circuit 2, 20, 21 is controlled as a function of the signal at output Out1 of first driver circuit 1, 10, 11. This minimizes asynchronicity of the output signals such as that caused by differences in transit time and component tolerances in two driver circuits 1, 10, 11 and/or 2, 20, 21. This results in a more pronounced phase opposition and a lower high-frequency emission of both bus lines H, L.

Figure 2A:
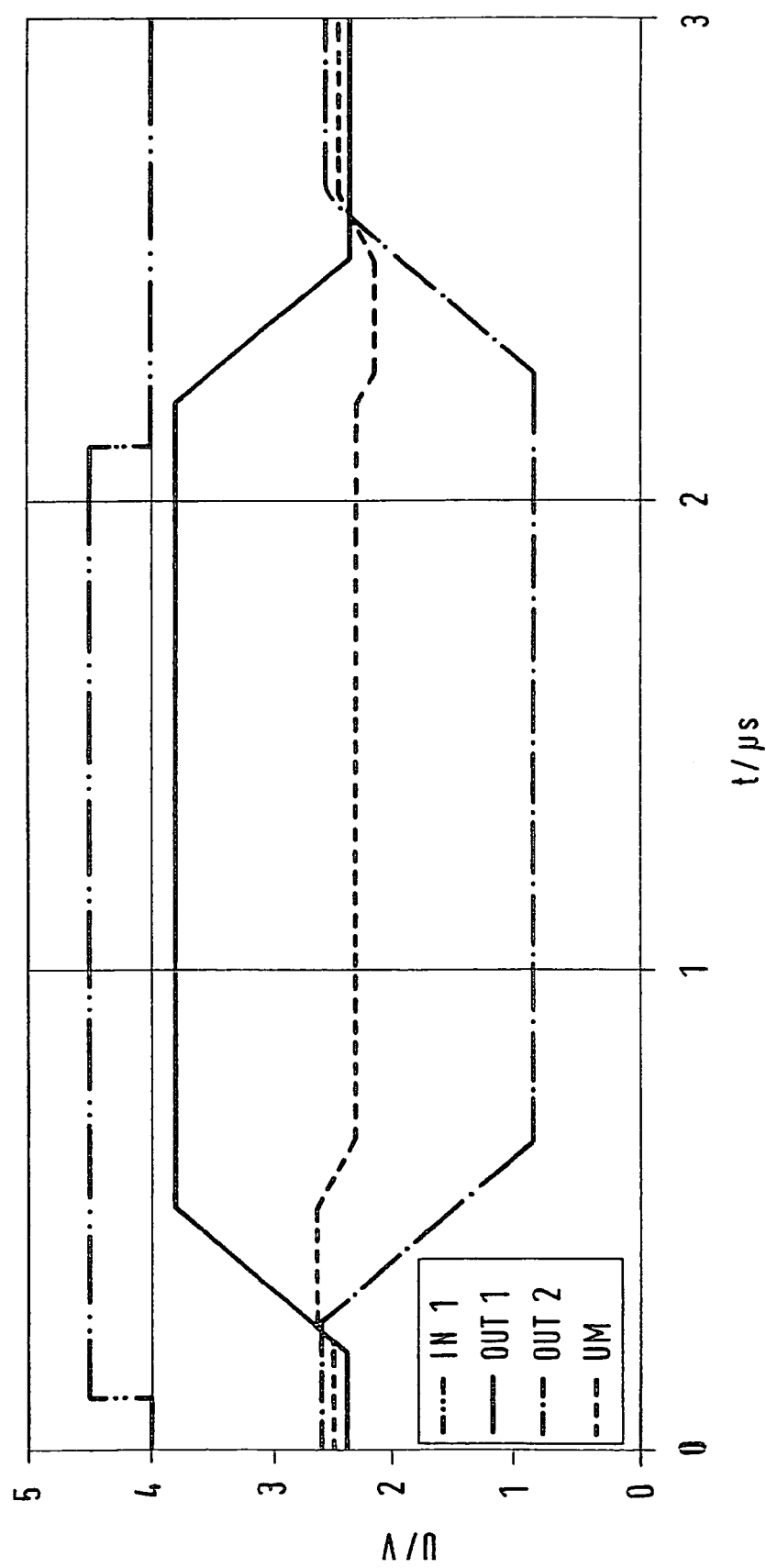
FIG. 2A is a time diagram of signal characteristics for a bus interface other than the exemplary embodiment and/or method of the present invention.

In FIGS. 2A, B, time characteristics of the voltage in a bus interface in other devices are compared with those of the bus interface according to the present invention.

FIG. 2A is a time diagram of signal characteristics in a bus interface in other devices. The time offset between signals Out1, Out2 at the respective outputs of the bus interface is clearly visible; center voltage UM has high peaks accordingly. Furthermore, the voltage range of two output voltages Out1 and Out2 is different.

Figure 2B:
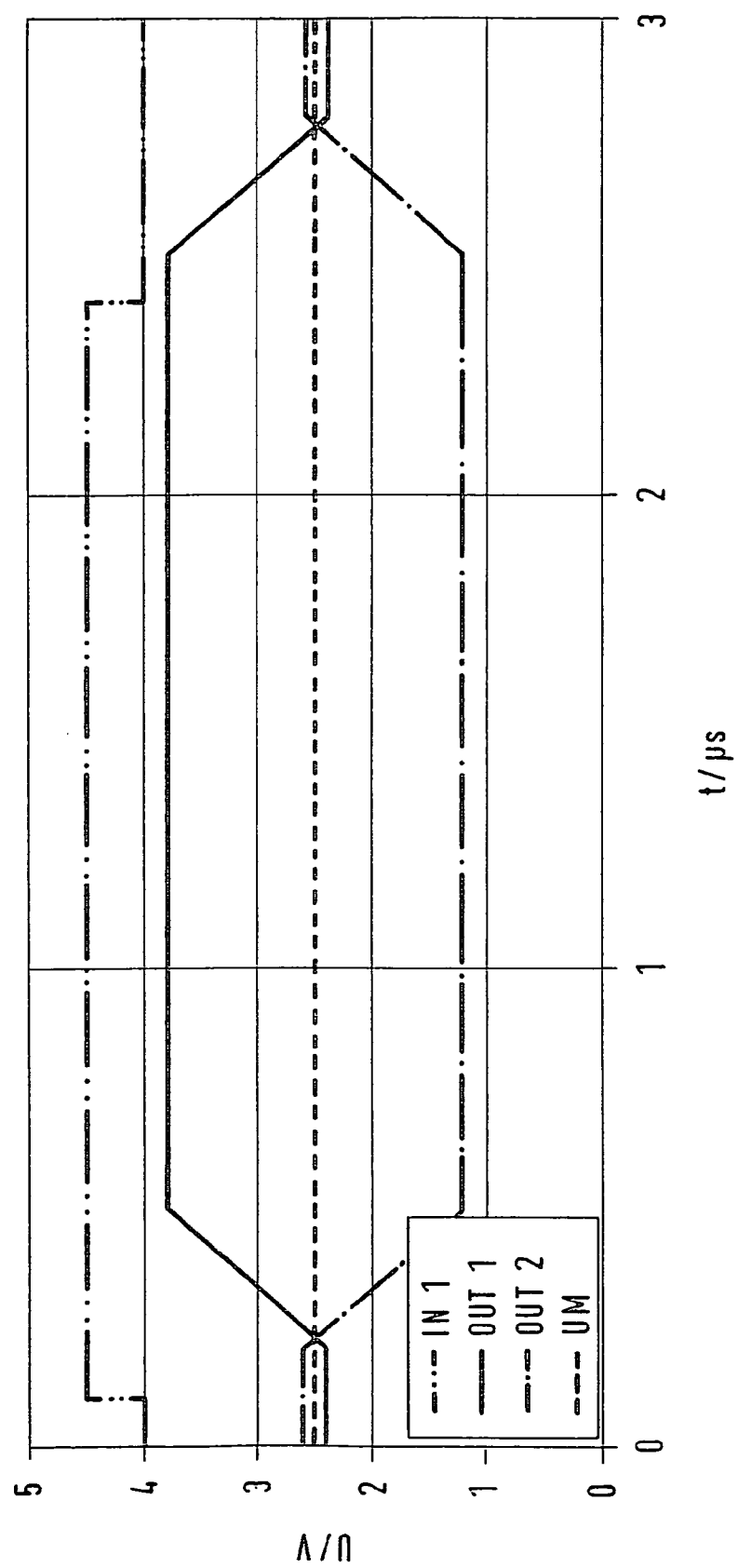
FIG. 2B is a time diagram of signal characteristics in the bus interface according to the exemplary embodiment and/or method of the present invention.

FIG. 2B illustrates time characteristics of the signals described here on the bus interface according to the exemplary embodiment of the present invention. Driver circuit 2, 20, 21, which is configured as a regulator, regulates center voltage UM at a constant U/2; there is no time offset between the two output voltages Out1 and Out2, and both output voltages Out1 and Out2 have the same voltage range.

According to the method of coupling a bus device to a bus having a pair of complementary bus lines H, L, the bus device is connected to input In1 of a first driver circuit 1, 10, 11 and output Out1 of first driver circuit 1, 10, 11 is connected to first bus line H of the pair of complementary bus lines. Output Out2 of the second driver circuit which is complementary to first driver circuit 1, 10, 11 is connected to second bus line L of the pair of complementary bus lines H, L, input In2 of second driver circuit 2, 20, 21 being connected to output Out1 of first driver circuit 1, 10, 11 such that input In2 of second driver circuit 2, 20, 21 is connected to output Out1 of first driver circuit 1, 10, 11 via center tapping point UM of a voltage divider 3, 4 which is connected between the two outputs Out1, Out2 of the two driver circuits 1, 10, 11; 2, 20, 21.

| List of Reference Notations | |
|---|---|
| 1 | Switching element |
| 2 | Operational amplifier |
| 3 | Voltage divider resistor |
| 4 | Voltage divider resistor |
| 5 | Resistor |
| 6 | Resistor |
| 10 | Resistor |
| 11 | Resistor |
| 20 | Resistor |
| 21 | Voltage source |
| H, L | Bus lines |
| In1 | Input |
| In2 | Input |
| Out1 | Output |
| Out2 | Output |
| UM | Center voltage |
| U | Power supply voltage |

What is claimed is:

1. A bus interface for connecting a bus device to a bus using a pair of complementary bus lines, the bus interface comprising:

a first driver circuit that includes an input connected to the bus device, and an output connected to a first bus line of the pair of complementary bus lines; and a second driver circuit that is complementary to the first driver circuit and that includes an output connected to a second bus line of the pair of complementary bus lines, wherein an input of the second driver circuit is connected to the output of the first driver circuit via a center tapping point of a voltage divider, which is connected between the output of the first driver circuit and the output of the second driver circuit, the second driver circuit including a regulator to regulate a potential at the center tapping point of the voltage divider at a predetermined level, wherein the second driver circuit is inverse-operated relative to the first driver circuit with respect to a common voltage.

2. The bus interface of claim 1, wherein the second driver circuit includes an operational amplifier.

3. The bus interface of claim 1, wherein the first driver circuit receives signals from an automotive communication component at the input of the first driver circuit.

4. The bus interface of claim 1, wherein the bus includes a controller area network bus.

5. A method for connecting a bus device to a bus using a pair of complementary bus lines, the method comprising:

connecting the bus device to an input of a first driver circuit;

connecting an output of the first driver circuit to a first bus line of the pair of complementary bus lines;

connecting an output of a second driver circuit, which is complementary to the first driver circuit, to a second bus line of the pair of complementary bus lines;

connecting an input of the second driver circuit to the output of the first driver circuit via a center tapping point of a voltage divider, which is connected between the output of the first driver circuit and the output of the second driver circuit, the second driver circuit including a regulator to regulate a potential at the center tapping point of the voltage divider at a predetermined level; and controlling the first driver circuit by an input signal, wherein the second driver circuit is inverse-operated relative to the first driver circuit with respect to a common voltage.

6. The method of claim 5, wherein the second driver circuit includes an operational amplifier.

7. The method of claim 5, wherein the first driver circuit receives signals from an automotive communication component at the input of the first driver circuit.

8. The method according to claim 5, wherein the bus includes a controller area network bus.

9. The bus interface of claim 1, wherein the bus interface is for a motor vehicle.

* * * * *